(12) United States Patent
Filatyev et al.

(10) Patent No.: US 11,125,063 B2
(45) Date of Patent: Sep. 21, 2021

(54) ACCELERATED INTERVAL COMMUNICATION USING OPENHOLES

(71) Applicant: ConocoPhillips Company, Houston, TX (US)

(72) Inventors: Sergei A. Filatyev, Houston, TX (US); Pradeep A. Govind, Houston, TX (US); Thomas J. Wheeler, Houston, TX (US)

(73) Assignee: CONOCOPHILLIPS COMPANY, Houston, TX (US)

(*) Notice: Subject to any disclaimer, the term of this patent is extended or adjusted under 35 U.S.C. 154(b) by 203 days.

(21) Appl. No.: 16/039,757

(22) Filed: Jul. 19, 2018

(65) Prior Publication Data

US 2019/0024488 A1    Jan. 24, 2019

Related U.S. Application Data

(60) Provisional application No. 62/534,476, filed on Jul. 19, 2017.

(51) Int. Cl.
| | |
|---|---|
| *E21B 43/24* | (2006.01) |
| *C09K 8/03* | (2006.01) |
| *C08K 3/22* | (2006.01) |
| *C09K 8/592* | (2006.01) |
| *E21B 43/26* | (2006.01) |
| *C08G 73/02* | (2006.01) |
| *C08K 3/34* | (2006.01) |
| *H01Q 1/04* | (2006.01) |

(52) U.S. Cl.
CPC ............ *E21B 43/2408* (2013.01); *C08K 3/22* (2013.01); *C09K 8/03* (2013.01); *C09K 8/032* (2013.01); *C09K 8/592* (2013.01); *E21B 43/2401* (2013.01); *E21B 43/26* (2013.01); *C08G 73/0266* (2013.01); *C08K 3/34* (2013.01); *H01Q 1/04* (2013.01)

(58) Field of Classification Search
CPC ............ C09K 8/03; C09K 9/032; E21B 43/26
USPC ....................................... 166/272.3
See application file for complete search history.

(56) References Cited

U.S. PATENT DOCUMENTS

| | | | |
|---|---|---|---|
| 5,215,146 A | 6/1993 | Sanchez | |
| 6,787,505 B1 * | 9/2004 | Maitland | C09K 8/34 507/103 |
| 7,909,093 B2 | 3/2011 | Brown | |
| 8,118,095 B2 | 2/2012 | Sarathi | |
| 8,312,926 B2 | 11/2012 | Wheeler | |

(Continued)

FOREIGN PATENT DOCUMENTS

| | | | |
|---|---|---|---|
| WO | 2012119076 | | 9/2012 |
| WO | WO2012119076 | * | 9/2012 |
| WO | 2015000065 | | 1/2015 |

OTHER PUBLICATIONS

Butler, R. M., "Thermal Recovery of Oil & Bitumen", Chapter 7: "Steam-Assisted Gravity Drainage", Prentice Hall, (1991).

*Primary Examiner* — Zakiya W Bates
*Assistant Examiner* — Ashish K Varma
(74) *Attorney, Agent, or Firm* — Boulware & Valoir

(57) ABSTRACT

Described herein are methods for accelerating the start-up in SAGD type processes wherein the volume between the injector and the producer is preheated utilizing open-holes drilled between wells. The recovery of hydrocarbons is also improved due to a viscous fluid drive in the open-holes during SAGD operations.

20 Claims, 11 Drawing Sheets

(56) References Cited

U.S. PATENT DOCUMENTS

| | | |
|---|---|---|
| 8,353,343 B2 | 1/2013 | Seaba |
| 8,365,823 B2 | 2/2013 | Dreher |
| 8,387,690 B2 | 3/2013 | Menard |
| 8,464,789 B2 | 6/2013 | Banerjee |
| 8,528,639 B2 | 9/2013 | Fang |
| 8,555,970 B2 | 10/2013 | Wheeler |
| 8,607,866 B2 | 12/2013 | Fang |
| 8,607,884 B2 | 12/2013 | Wheeler |
| 8,656,998 B2 | 2/2014 | Dong |
| 8,656,999 B2 | 2/2014 | Latimer |
| 8,720,547 B2 | 5/2014 | Banerjee |
| 8,720,549 B2 | 5/2014 | Banerjee |
| 8,770,281 B2 * | 7/2014 | Arthur .............. E21B 43/166 166/245 |
| 8,936,090 B2 | 1/2015 | Sultenfuss |
| 8,967,282 B2 | 3/2015 | Dreher |
| 8,978,755 B2 | 3/2015 | Sultenfuss |
| 9,267,367 B2 | 2/2016 | Wheeler |
| 9,453,400 B2 | 9/2016 | Wheeler |
| 9,587,480 B2 * | 3/2017 | Guerrero .............. E21B 43/30 |
| 9,739,123 B2 | 8/2017 | Wheeler |
| 9,845,668 B2 | 12/2017 | Ryan |
| 9,920,596 B2 | 3/2018 | Dong |
| 2006/0081374 A1 * | 4/2006 | Bland .............. E21B 43/24 166/300 |
| 2010/0294488 A1 * | 11/2010 | Wheeler .......... E21B 43/2408 166/248 |
| 2011/0174488 A1 | 7/2011 | Morris |
| 2012/0061080 A1 * | 3/2012 | Sultenfuss ........ E21B 43/2406 166/302 |
| 2012/0227964 A1 | 9/2012 | Lamont |
| 2012/0227966 A1 * | 9/2012 | Dreher, Jr. .......... E21B 43/243 166/272.3 |
| 2012/0312534 A1 | 12/2012 | Nasr |
| 2013/0000897 A1 | 1/2013 | Fang |
| 2013/0213652 A1 | 8/2013 | Stalder |
| 2014/0190689 A1 | 7/2014 | Warren |
| 2015/0007996 A1 * | 1/2015 | Ayasse .............. E21B 17/042 166/308.1 |
| 2015/0159476 A1 | 6/2015 | Warren |
| 2015/0198022 A1 * | 7/2015 | Stanecki .......... E21B 43/2408 166/272.3 |
| 2015/0198027 A1 | 7/2015 | Wickramathilaka |
| 2015/0337622 A1 * | 11/2015 | Lopez .............. E21B 43/08 166/66.6 |
| 2016/0341021 A1 | 11/2016 | Chen |
| 2017/0081950 A1 * | 3/2017 | Filatyev .......... E21B 43/2406 |
| 2017/0356275 A1 | 12/2017 | Wheeler |

\* cited by examiner

ACCELERATED INTERVAL COMMUNICATION USING OPENHOLES

PRIOR RELATED APPLICATIONS

This application claims priority to U.S. Ser. No. 62/534,476, filed Jul. 19, 2017 and expressly incorporated by reference in its entirety for all purposes.

FEDERALLY SPONSORED RESEARCH STATEMENT

Not applicable.

FIELD OF THE DISCLOSURE

The disclosure relates to a steam assisted gravity drainage (SAGD) oil production method that reduces SAGD start-up time and costs, and improves overall SAGD performance.

BACKGROUND OF THE DISCLOSURE

Many countries in the world have large deposits of oil sands, including the United States, Russia, and various countries in the Middle East. However, the world's largest deposits occur in Canada and Venezuela. Oil sands are a type of unconventional petroleum deposit. The sands contain naturally occurring mixtures of sand, clay, water, and a dense and extremely viscous form of petroleum technically referred to as "bitumen," but which may also be called heavy oil or tar.

Crude bitumen is a thick, sticky form of crude oil, so heavy and viscous (thick) that it will not flow unless heated or diluted with lighter hydrocarbons. Often times, it can be in excess of 1,000,000 cP. Due to their high viscosity, these heavy oils are hard to mobilize, and they generally must be made to flow by heat or dilution in order to produce and transport them. One common way to heat bitumen is by injecting steam into the reservoir. This can be done by steam injection based methods, such as cyclic steam injection (CSS), steam drive, or by steam assisted gravity drainage (SAGD), and various modifications thereof.

SAGD is the most extensively used technique for in situ recovery of bitumen resources in the McMurray Formation in the Alberta Oil Sands and other reservoirs containing viscous hydrocarbons. In a typical SAGD process, two horizontal wells are vertically spaced by 4-10 meters. The production well is located near the bottom of the pay and the steam injection well is located directly above and parallel to the production well. In SAGD, steam is injected continuously into the injection well, where it rises in the reservoir and forms a steam chamber (FIG. 1A).

With continuous steam injection, the steam chamber will continue to grow upward and laterally into the surrounding formation. At the interface between the steam chamber and cold oil, steam condenses and heat is transferred to the surrounding oil. This heated oil becomes mobile and drains, together with the condensed water from the steam, into the production well due to gravity segregation within the steam vapor and heated bitumen and steam condensate chamber (FIG. 1B).

This use of gravity gives SAGD an advantage over conventional steam injection methods. SAGD employs gravity as the driving force and the heated oil remains warm and movable when flowing toward the production well. In contrast, conventional steam injection, such as in CSS, displaces oil to a cold area where its viscosity increases and the oil mobility is again reduced.

Gravity is not the only important factor for SAGD. Many studies have shown that the performance and ultimate success of SAGD depends on many factors including reservoir properties, steam chamber development, the length, spacing and location of the two horizontal wells, heat transfer, heat loss, and the ability to impact steam trap control to prevent inefficient production of live steam.

Typically, SAGD wells are drilled about 5 meters apart vertically to achieve steam trap control whereby a gas-liquid (steam-vapor) interface is maintained above the production well to prevent short-circuiting of steam and undue stress on the production well sand exclusion media. In order to establish initial fluidic communication between the wells, a "start-up" period is implemented, wherein steam is circulated for 3 to 5 months in both wells until the wells reach pressure and fluid communication. This start-up period prior to starting SAGD operation is necessary for a successful SAGD recovery. The duration of the start-up depends on the time needed for the heat to conduct through the cold bitumen and raise the temperature of the inter-well rock/bitumen volume to enhance mobility and reduce bitumen viscosity. However, this 3 to 5 month start-up time increases the overall cost of SAGD because of the amount of steam required and the delay before oil production can begin. Decision makers may limit projects available for SAGD production because of this added cost.

As such, many improvements to SAGD operations focus on accelerating the start-up period. Suggested improvements include implementing differential pressure between the wells during the steam circulation period, solvent soak/squeezes, cold/hot water dilation, surfactant injection, snorkel designs, and preheating with radio frequencies.

U.S. Pat. No. 5,215,146, for example, describes a method for reducing start-up time by maintaining a pressure gradient between the upper and lower wells with foam. The pressure gradient forces the hot fluids from the upper well to the lower well. However, the method adds undesired costs and maintenance requirements due to the need to create downhole foam, which is typically not required in a SAGD process.

WO2015000065 describes the injection of a solvent-steam mixture to aid in developing the fluid communication between the SAGD wells. US20110174488 describes a method of injecting only a solvent (xylene, benzene, toluene, phenol or mixtures) into the reservoir to develop the required fluid communication.

Other methods have focused on the use of radio-frequencies to preheat the reservoir. U.S. Pat. No. 8,936,090, for example, describes a method for using radio frequencies to heat the area between and around the two wells in order to reduce the start-up time for SAGD. Radio frequency heating devices are placed inside the lateral wells and are used to heat the area between and around the two wells in order to reduce the start-up time for SAGD. Further, the devices can re-heat the injected steam after it loses heat energy during the initial injection.

US20100294488 describes a method for preheating a formation prior to beginning SAGD production. In this preheating stage, an activator is injected into the formation and then excited using radio frequencies of 0.3 gigahertz (GHz) to 100 GHz to generate heat in the reservoir. The SAGD operation then proceeds. However, the methods described herein also use the much higher frequency range, and thus are more energy intensive.

U.S. Pat. No. 8,978,755 describes the use of both solvents and radio frequency to accelerate the start-up phase. Here, an initial solvent (not water) pre-soaking of the wellbores is followed by heating of the solvent to a vapor using radio frequencies until vapor pressure increases sufficiently to squeeze at least one soaked well to introduce convection heating to the formation.

However, there still exists a need for more improvements to the SAGD start-up and production periods. One notable problem that occurs is that infill wells with open-hole fishbones drilled from them remain cold for long periods of time or do not contribute to production from the infill well. Preferably, the improvements will be inexpensive to initiate and not require costly solvents. Even incremental improvements in technology can mean the difference between cost effective recovery and reserves that are unable to recover the economic costs of production.

SUMMARY OF THE DISCLOSURE

Described herein are methods for accelerating the start-up period for SAGD by increasing the number of heating sources and improving hydrocarbon recovery by encouraging flow into the producer well. Specifically, vertical open-hole wells are drilled near the injector and producer wells and covering most or all the vertical depth of play. Particles, particularly those that are capable of being heated by microwave/radio frequency, resistive, and/or chemical heating, are then placed in the vertical open-hole wells. The open-holes and/or particles are then heated, resulting in the volume between the wells being preheated. Once SAGD begins, the particles prevent the open-hole wells from collapsing, allowing for a viscous force, in addition to the gravity drainage, to encourage flow through the open-hole wells into the producer.

In some reservoirs, the preheating phase replaces the traditional steam circulation start-up step such that SAGD operations begin immediately. In others, shortened steam circulation will be necessary after the preheating phase before SAGD operations can begin. In yet others, the steam circulation period and preheating phase will occur simultaneously.

The method begins by drilling the SAGD well pairs into the reservoir. Typically, the wells are separated by a vertical distance of 4-10 m. However, the distance can be less than 3 meters, which reduces volume that needs to be heated by the described methods. Usually, the producer is located 1-2 meters from the bottom of the reservoir and the steam injector four to ten meters above the producer, and both are typically placed near the bottom of a payzone.

To better manage steam trap control and well integrity, passive flow control devices (FCD, also called inflow control devices or ICD) can be used on the injector, producer or both, as opposed to just the conventional slotted liner. The FCDs will provide a high-pressured differential of 500 kPa to 1500 kPa for communication between the injector and the producer and the hot fluid (i.e. steam) can then be circulated with significantly shortened start up times (<30 days). Examples of passive FCDs include nozzle ICDs, helical channel ICDs, hybrid ICDs, and the Equalizer®" by Baker Hughes®. Using higher drawdown within the fishbones will increase contribution from viscous forces. This is achieved by using an FCD that induces a higher drawdown on the conduit maximizing viscous force drive. When steam reaches the conduit, flow is choked back, allowing the viscous forces to again dominate the open-hole pathway.

Several vertical/slanted open-hole wells are drilled near the injector and producer wells along the well length. The heating methods will then be applied to the reservoir through these open-hole high permeability conduits.

The number of open-hole wells will depend on the size of the field being produced. At least one well is needed for each well pair, but preferably each well pair has two or more open-holes. Further, an open-hole may be needed near the heel and/or toe of the wells to aid in maintaining a uniform steam chamber.

Once the communication occurs with the steam chamber, the open-hole wells will collapse because the bitumen cement holding the unconsolidated sands in place melts and flows to the producer. To maintain these high permeability pathways, particles are placed in the open-hole. In some embodiments, the particles are heatable. The particles may be of the same kind or a mixture that can be heated using different techniques. For other embodiments, the particles are not heatable and are used to prevent wells from collapsing during SAGD operations.

Any technique can be used to heat the particles and/or open-hole wells and thereby heat reservoir volume near the producer and injector. In some embodiments, a single technique is used for all the open-holes. For others, a combination of techniques can be used. The techniques for use in the disclosed method include:

1. MicroWave/Radio frequency (MW/RF) heating
2. Resistive heating
3. Chemical heating Microwave/Radio frequency (MW/RF) heating:

Particles susceptible to MW/RF heating are placed inside the open-hole(s) during or right after drilling. Then, MW/RF radiation is directed at the particles to heat them. Ideally, this heating method is utilized as the SAGD well pair is undergoing the steam circulation period.

Heating with MW/RF frequencies is generally an absorptive heating process, which results from subjecting polar molecules to a high frequency electromagnetic field. As the polar molecules seek to align themselves with the alternating polarity of the electromagnetic field, work is done and heat is generated and absorbed.

Thus, the frequencies used can be a range that heats both the added particles and polar molecules in the reservoir. When RF energy is applied to hydrocarbons which are trapped in a geological formation, the polar molecules, i.e., the hydrocarbons and connate water, are heated selectively, while the non-polar molecules of the formation are virtually transparent to the RF energy and absorb very little of the energy supplied.

Thus, using variable microwave and radio frequencies, one can tune the microwave frequency generated within the formation to one that interacts best with the dipole moment present within the hydrocarbons and the particles.

Alternatively, only the particles can be targeted. By choosing specific particles to inject into the formation, one skilled in the art would have the requisite knowledge to select the exact microwave or radio frequency required to achieve maximum heating of the particle. This eliminates the need to arbitrarily generate variable microwave frequency, which may or may not be able to efficiently absorb the microwave radiation.

Examples of particles that are susceptible to MW/RF heating include metal ion salts. Asymmetrical compounds selected for the microwave energy absorbing substance provide more efficient coupling with the microwaves than symmetrical compounds. In some embodiments, ions forming the microwave energy absorbing substance include divalent or trivalent metal cations. Other examples of particles suitable for this method include inorganic anions such as halides. In one embodiment the particle could be a metal containing compound such as those from period 3 or period 4 of the periodic table. In yet another embodiment the particle could be a halide of Na, Al, Fe, Ni, or Zn, including $AlCl_4^-$, $FeCl_4^-$, $NiCl_3^-$, $ZnCl_3^-$ and combinations thereof. Other suitable compositions for the particle include transitional metal compounds or organometallic complexes. The more efficient an ion is at coupling with the MW/RF radiation the faster the temperature rise in the system.

The radio frequency (RF) heating device may use a surface located active electrical current source operating at radio or microwave frequencies to couple electrical energy to one or more antennas in the hydrocarbon formation—e.g., in the open-hole. The active electrical source may be a semiconductor device such as a ceramic metal oxide junction (e.g. CMOS) or like devices capable of transresistance.

The coupling mechanism between the radio frequency electrical source and the antenna may be an open wire transmission line, a closed wire transmission line or a guided wire transmission line. The transmission line advantageously reduces transmission loss relative to unguided transmission. The guided wire transmission line may be advantageous for ease of installation with a cable tool type drilling apparatus, as will be familiar to those in the hydrocarbon arts.

The transmission line may utilize one or more of a forward wave, a reflected wave or a standing wave to convey the electrical currents. The characteristic impedance of the transmission line may be between 50 ohms and 300 ohms, although the invention is not so limited as to require operation at specific characteristic impedance. The higher impedances may reduce $I^2R$ losses in conductive materials while the lower impedances may allow smaller dielectric dimensions.

The microwave/radio frequency heating device may include an antenna to convert electrical currents into heating energies such as radio waves and microwaves. Preferred antennas include isotropic antennas, omnidirectional antennas, polar antennas, logarithmic antennas, yagi uda antennas, microstrip patches, horns, or reflectors antennas. The isotropic antenna may be used to diffuse the heating energy in a non-directional fashion. As can be appreciated by those in the art, radiated waves are created by the Fourier transform of current distributions in the antenna.

The radio frequency heating device may use radio and microwave frequencies between 100 MHz and 1000 MHz. In particular, the Industrial Scientific Medical (ISM) frequencies at 902-928 MHz are identified. This spectrum may provide a useful trade between heating dissipation, penetration, and useful antenna size. In a preferred embodiment the heating energies are electromagnetic energies such as waves to heat the hydrocarbon molecules by resonance, dissipation, hysteresis, or absorption.

Resistive Heating

Resistive heating can also be utilized with the open-holes by placing a conductive material in the open-holes during or right after drilling. The conductive material should have a high resistivity (i.e. metal proppants, bauxite proppants, materials in powder form, granulars). When a voltage is applied across the open-holes, the conductive material will begin to heat. As before, this method can be utilized while the main well pair is undergoing steam circulation.

The conductive material can include metals, electrolytes, superconductors, semiconductors, plasmas, and some non-metallic conductors such as graphite and conductive polymers. Exemplary metals include copper, aluminum, silver, and their salts. Water is not a good conductor, however the addition of electrolytes can increase its conduction. In some embodiments, connate water can be mixed with conductive salts to act as a conductive material.

Examples of conductive polymers include polydiacetylene, polyacetylene, polypyrrole, polyaniline, polythiophene, polyisothionaphthene, polyheteroarylenvinylene, in which the heteroarylene group can be the thiophene, furan or pyrrole, poly-p-phenylene, polyphthalocyanine and the like, and their derivatives (formed for example from monomers substituted with side chains or groups), their copolymers and their physical mixtures. Polyaniline is the preferred conducting polymer.

Ideally, the conductive material is in the shape of small particles, powders and granulars. This will allow for more effective conduction and quicker heating time. The materials have a mean particle size less than the median pore size in the reservoir, typically <10 microns, or about 1-5 micron, or less.

The applied voltage is between 220 volts and 4,000 volts. Preferably, the applied voltage is between 1,000 and 3,000 volts.

Chemical Heating

Exothermic chemical reactions inside the open-hole wells can also be used to aid in heating the reservoir during the steam circulation period.

In some applications, a reaction-dispersion process can be used, wherein a chemical disperses through a fluid column and then undergoes a reaction with another chemical species. The reaction products further diffuse and disperse through the porous media. In the context of the currently disclosed methods, chemical pellets can be introduced into the open-holes during or right after drilling. The pellets then undergo a chemical transformation releasing heat in the open-hole.

One example is to use elemental sodium pellets. The highly exothermic reaction of sodium with the in-situ formation water results in the liberation of large amount of heat that can reduce oil viscosity and potentially generate in-situ steam as well. Further, the $H_2$ gas that is liberated, may thin the viscosity of the oil somewhat, although it has low solubility in oil.

To prevent premature reactions, the elemental sodium pellets will need coating to prevent instantaneous reaction of sodium with water right after placement of pellets in the open-hole. The coating should degrade over time releasing heat to the open-hole over a period of time. The main mechanism is the transport of sodium to the reaction interface of the pellet and the subsequent displacement of the reaction zone. Another important advantage of this particular reaction is the formation of sodium hydroxide, which reduces interfacial tension at the bitumen interface and improves recovery.

An alternative process is the displacement of carbon dioxide in a simultaneous injection of carbon dioxide and elemental sodium in a heavy oil reservoir. When elemental sodium suspended in liquid carbon dioxide is injected into the reservoir, it will diffuse through the carrier phase and then interact with water resulting in oil viscosity reduction and enhanced mobility due to the combined benefit from carbon dioxide solubility and reaction heating.

Other examples of the dispersion reactions can include use of alkali metals such as elemental potassium or elemental lithium.

Combustion reactions with magnesium, metal alloys, calcium, iron, phosphorus, sulfur, solid propellants, etc. can also be used. Combustion of e.g. magnesium, calcium, iron, phosphorus, sulfur, or metal alloys will require injection of an oxidizer such as air/oxygen. On the other hand, solid propellants contain both fuel and oxidizer and do not require any additional oxidizing agent.

Additionally, thermite reactions can also be used. This will require the use of a heating mechanism to ignite the reaction. Thermite is a pyrotechnic composition of metal powder, fuel and metal oxide. When ignited by heat, thermite undergoes an exothermic reduction-oxidation (redox) reaction.

Thermites have diverse compositions. Fuels include aluminum, magnesium, titanium, zinc, silicon, and boron. Aluminum is common because of its high boiling point and low cost. Oxidizers include bismuth(III) oxide, boron(III) oxide, silicon(IV) oxide, chromium(III) oxide, manganese(IV) oxide, iron(III) oxide, iron(II,III) oxide, copper(II) oxide, and lead(II,IV) oxide.

Though the above heating techniques are described as used in conjunction with the steam circulation during start-up, it should be noted that the techniques can also be used either before start-up circulation or in lieu of start-up circulation (e.g., replacing the traditional startup of steam circulation in both wells).

Further, any of the above methods can be used in combination. For instance, a resistive heating technique can be used in conjunction with a thermite chemical reaction. Here, the resistive heating will not only heat the reservoir, but also serve as the heat to ignite the thermite reaction.

Another option is to use the injector and the producer as the two opposite electrodes, thus creating the resistive heater across the reservoir. An 80/20 (Nickel/Chromium) mix will suffice for this. Other options include FeCrAl or $MoSL_2$.

In standard SAGD start-up operations, there are two sources of heat—injector and producer wells. However, an increase in the number of heat sources will speed up the preheating process. To increase the number of heat sources, a plurality of vertical/slanted open-holes will be drilled near the injector and producer wells along the well length and various heating techniques will be used to provide heating to the reservoir through these open-hole high permeability conduits. This result in significant cost savings and enhanced economics (NPV) by being able to startup the wells much faster in time. The open-hole wells, however, are quick and easy to drill, and without casing, are not inordinately expensive.

The increase in heat sources are expected to reduce the start-up period by at least two months. Preferably, the start-up period is reduced to just one month. Most preferably, the start-up period is eliminated, wherein the open-hole heating techniques replace the steam circulation during conventional start-up.

Further, by keeping the open-hole wells open during SAGD, recovery can also be improved. During operations, viscous fluid enters the open-hole wells, with the dense viscous fluid filling the open-hole wells and the less dense fluids and gases tend to override the fishbone well, ensuring the fishbone is dominated by viscous force drive. This results in a viscous force drive that is in addition to the gravity drainage in SAGD. The viscous force encourages flow through the open-hole wells to the producer and increasing the amount of hydrocarbons recovered. The particles in the open-hole wells also help to maintain the high permeability pathways by maintaining the communication between the wells and the producer and maximizing the impact of the viscous force drive due to the pressure differential.

This summary is provided to introduce a selection of concepts that are further described below in the detailed description. This summary is not intended to identify key or essential features of the claimed subject matter, nor is it intended to be used as an aid in limiting the scope of the claimed subject matter.

As used herein, the term 'hydrocarbon' refers to petroleum components, including conventional crude, heavy oil, bitumen, tar sands, asphaltenes, and the like. In one embodiment, SAGD is used with high viscosity oils, tars or bitumens that require heating to liquefy or produce the hydrocarbon. In some instances, SAGD may be used with other hydrocarbon reservoirs as an enhanced oil recovery technique or a method to produce additional hydrocarbons from a reservoir. In one embodiment, SAGD is used to produce bitumen from a subterranean reservoir.

As used herein, vertical means perpendicular to the horizontal plane, but also includes slanted wells more than 45° away from the horizontal plane, preferably 60-90°.

As used herein, the term "SAGD" includes all steam heating and gravity drainage production methods, even where combined with other methods such as solvent assisted production methods, electromagnetic (EM) heating methods, cyclic methods and the like.

As used herein, the term "start-up" is known in the art as not only a period of time but a configuration of the well where steam is injected into both the injection and production wells in order to establish a good steam chamber and bring the wells into fluid communication. Later, the well pairs are converted to SAGD operations and steam is typically injected only into the injectors and oil is produced at the producers. Depending on formation lithology (i.e. reservoir heterogeneity) and actual interwell vertical spacing, this preheating or start-up period normally takes 3-6 months before sufficient mobility of the bitumen is established (bitumen temperatures >80° C.) and the process can be converted to SAGD.

A "flow control device" or "FCD" can be considered passive or active. Passive control almost always involves geometrical modifications, such as nozzles or long flow pathways. Currently, there are four different passive inflow control devices or "ICD" designs in the industry: nozzle-based, helical channel, tube-type and hybrid channel. They respectively use a restriction mechanism (nozzle-based), a friction mechanism (helical channel) or both mechanisms (tube-type and hybrid channel) to achieve a uniform inflow profile.

"Autonomous inflow control devices" or "AICDs" are also available, e.g., from Halliburton. AICDs are self-adjusting or active inflow control devices that act as traditional/passive ICDs during oil production. However when low viscosity fluids break through, the AICD chokes them slowing down the flow from the zone producing unwanted fluids. This action occurs autonomously, using dynamic fluid technology to discern from desired and undesired fluids.

As used herein, the terms "flow control device" and "inflow control device" are used interchangeable to refer to a passive component installed as part of a well completion to equalize reservoir inflow along the length of the wellbore. Flow control devices are designed to promote a more uniform distribution of steam along the injection well and fluid draw-down to the production well. This definition does not include screens, which control sand and particulate inflow through the screen only.

As used herein, "near" means <5 meters, preferably <3 m, <2.5 m, <2 m, <1.5 m and most preferred 1-3 m or <1 m.

By the term "providing," as used herein, we do not mean to imply contemporaneous drilling or lining of wells, and existing wells and liners can be used, if correctly spaced and completed. However, in many cases, at least one well will be drilled since open-holes are typically not combined with SAGD well pairs.

As used herein, the term "open-hole" refers to uncased wells. It is also called a bare-foot well.

As used herein, the term "particle" generally refers to minute portions of matter. In one embodiment the particles are greater in size than the sand in the reservoir. In another embodiment the particles are D50 or greater. It does not require any particular shape or composition as the particles can be, for example, metal, polymeric, thermite, graphite, and the like.

The use of the word "a" or "an" when used in conjunction with the term "comprising" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise", "have", "include" and "contain" (and their variants) are open-ended linking verbs and allow the addition of other elements when used in a claim.

The phrase "consisting of" is closed, and excludes all additional elements.

The phrase "consisting essentially of" excludes additional material elements, but allows the inclusions of non-material elements that do not substantially change the nature of the invention.

The following abbreviations are used herein:

| ABBREVIATION | TERM |
| --- | --- |
| SAGD | steam assisted gravity drainage |
| FCD | Flow control device, aka ICD |
| NVP | net present value |
| MW/RF | Microwave/Radio Frequency |
| ICD | Inflow control device |
| SCTR | Sector |
| SOR | Steam to oil ratio |
| CSTR | Cumulative steam to oil ratio |

DESCRIPTION OF EMBODIMENTS OF THE DISCLOSURE

Figure 1A:
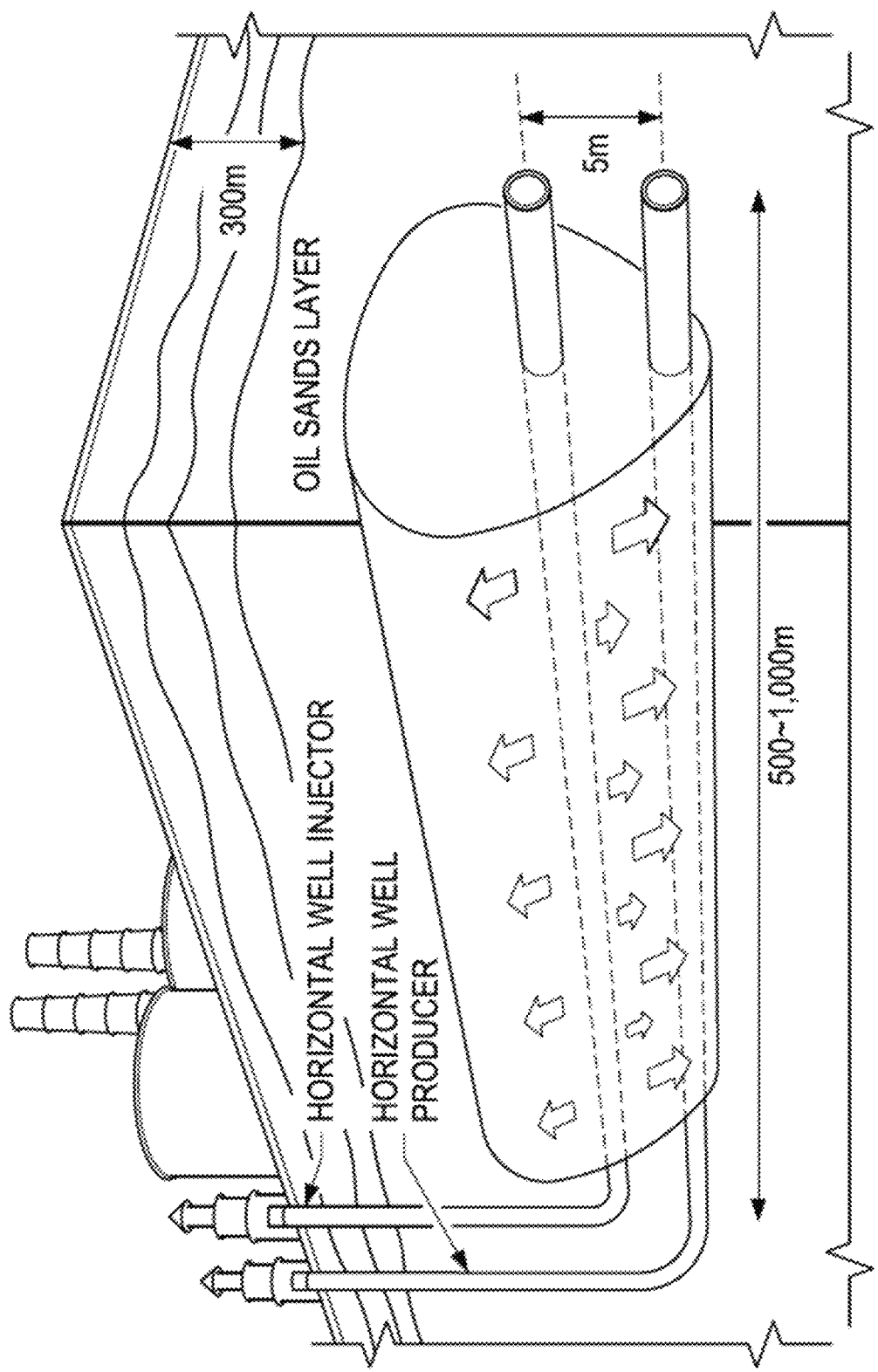
FIG. 1A Typical prior art SAGD well pair.
Figure 1B:
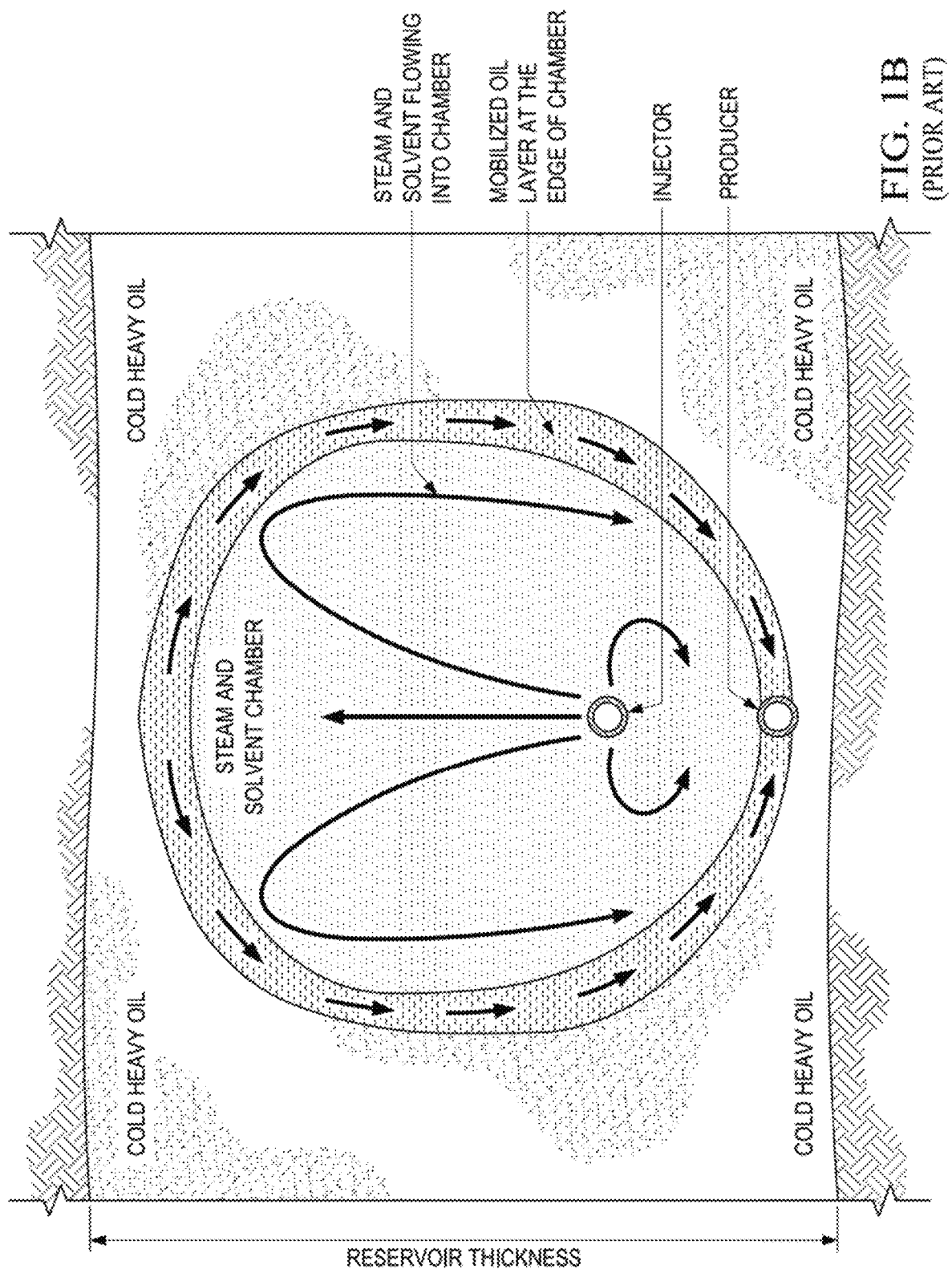
FIG. 1B SAGD steam chamber.
Figure 2:
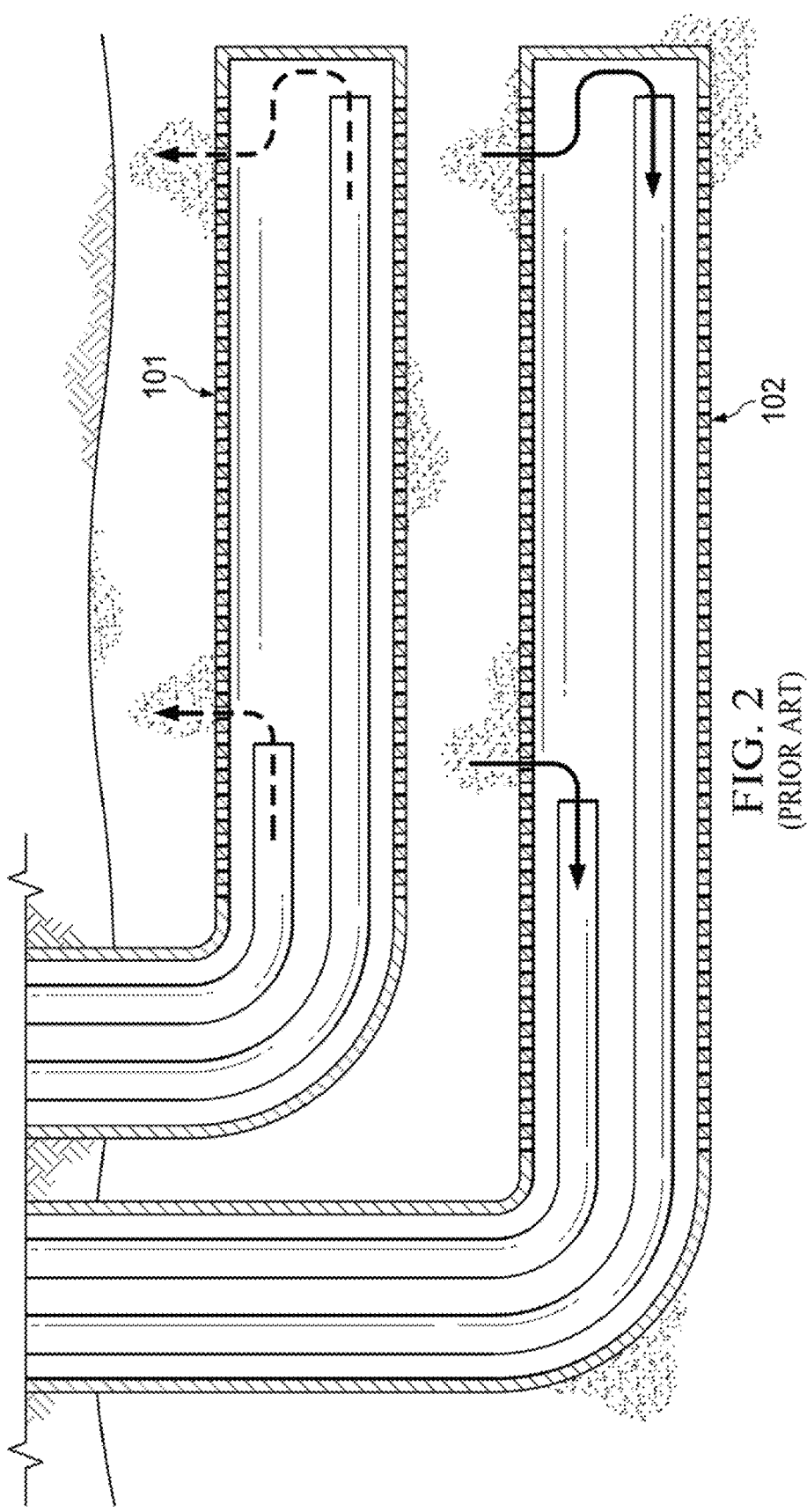
FIG. 2 Typical prior art SAGD completion design with toe and heel tubing in both a steam injection liner and a producing liner.

The invention provides novel methods for accelerating the start-up period for SAGD by increasing the number of heating sources and improving SAGD recovery by imparting a viscous force drive in addition to the gravity drainage. Specifically, open-holes are drilled between the injector and producer wells, and methods of heating (microwave/radio frequency, resistive, and/or chemical heating) are used in the open-holes to heat the volume between the wells. The vertical open-hole wells can advantageously drill off the producer or injector, but can also be stand alone vertical wells. This allows for the start-up period for fishbone wells and/or the infill wells to be decreased.

The present methods includes any of the following embodiments in any combination(s) of one or more thereof:

A method of producing hydrocarbon from a subsurface formation comprising:
providing a gravity drainage production well pair within a formation comprising an horizontal injection well over a generally parallel horizontal production well;
providing one or more vertical open-hole well(s) having particles therein near said injection well and said production well;
heating said particles, wherein said heated particles transfer heat to said formation;
circulating steam in said injection well and said production well for a startup period until said injection well and said production well are in fluid communication;
injecting steam only into said injection well and producing hydrocarbons from said production well,
wherein said startup period is reduced in time as compared with a similar method omitting said vertical open-hole wells and said particle heating.
A method of producing hydrocarbon from a subsurface formation comprising:
providing a gravity drainage production well pair within a formation comprising an cased horizontal injection well over a generally parallel cased horizontal production well;

-continued providing a plurality of vertical open-hole lateral wells originating from said production well and traversing upwards near said injector well to traverse at least 90% of the play (or 95%) and having heatable particles therein;
heating said particles, wherein said heated particles transfer heat to said formation;
wherein a startup period to place said injection well and said production well in fluid communication is reduced in time as compared with a similar method omitting said vertical open-hole wells and said particle heating.
Any method herein, wherein said particles are susceptible to Microwave/Radio Frequency (MW/RF) and said heating step comprises exciting and heating said particles using antenna generating microwaves or radio frequency.
Any method herein, wherein said particles are chosen from a group comprising metal ion salts, transitional metal complexes or organometallic complexes.
Any method herein, wherein said particles are conductive and said heating step comprises applying a voltage to said particles.
Any method herein, wherein said particles are chosen from a group comprising metals, electrolytes, superconductors, semiconductors, plasmas, graphite, conducting polymers or combinations thereof.
Any method herein, wherein said conducting polymers are polydiacetylene, polyacetylene, polypyrrole, polyaniline, polythiophene, polyisothionaphthene, polyheteroarylenvinylene, poly-p-phenylene, polyphthalocyanine, their derivatives, their copolymers, or combinations thereof.
Any method herein, wherein said particles are polyaniline.
Any method herein, wherein said particles react exothermically with water, and said heating step comprises reacting said particles with water in said reservoir.
Any method herein, wherein said particles are chosen from a group comprising elemental sodium, elemental potassium, elemental lithium, elemental calcium, elemental magnesium, a phosphorus oxide, iron, and sulfur.
Any method herein, wherein said particles have a water-soluble coating.
Any method herein, wherein said particles are thermite and the heating step initiates a thermite reaction.
Any method herein, wherein said thermite has a fuel chosen from a group comprising aluminum, magnesium, titanium, zinc, silicon, and boron, and an oxidizer chosen from a group comprising bismuth(III) oxide, boron(III) oxide, silicon(IV) oxide, chromium(III) oxide, manganese(IV) oxide, iron(III) oxide, iron(II, III) oxide, copper(II) oxide, and lead(II, IV) oxide.
Any method herein, wherein said injection, producer, or both wells have at least one flow control device.
Any method herein, wherein said flow control devices are both a rate sensitive flow restrictor or a rate sensitive flow valve.
Any method herein, wherein said heating step and said circulating step occur at the same time.
Any method herein, wherein said heating step occurs before said circulating step occurs.
Any method herein, wherein said vertical open-hole wells are stand-alone wells.
Any method herein, wherein said vertical open-hole wells are lateral wells drilled upwardly from said producer well.
Any method herein, wherein said vertical open-hole wells traverse at least 75%, 80%, 85%, 90% or 95% of the vertical depth of a play.
Any method herein, wherein said vertical open-hole wells are within 1 meter of said injection well and said production well;
An improved start-up method for a Steam Assisted Gravity Drainage (SAGD) operation, wherein said SAGD operation comprises forming a gravity drainage production well pair within a formation comprising an horizontal injection well 3-10 meters over a parallel horizontal production well, wherein steam is circulated through said injection well and said production well during a start-up period before gravity drainage of hydrocarbons begins, said improvement comprising drilling a plurality of vertical open-hole wells near said injection well and said production well and filling said open-holes with one or more particles, and heating said particles during said start-up period such that the heated particles transfer heat to the surroundings, wherein said improvement decreases the start up period as compared to a similar method not using open-hole wells and heating of particles.
Any method herein, wherein said particles are susceptible to Microwave/Radio Frequency (MW/RF) and said heating step comprises exciting and heating said particles using antenna generating microwaves or radio frequency.
Any method herein, wherein said particles are conductive and said heating step comprises applying a voltage to said particles.
Any method herein, wherein said particles react exothermically with water and the heating step comprises reacting said particles with water in said reservoir.
Any method herein, wherein said particles are thermite and the heating step initiates the thermite reaction.
An arrangement of wells for production of heavy oil, said arrangement comprising a lower, cased horizontal production well having open-hole lateral wells drilled upwardly therefrom, said open-hole lateral wells being filled with heatable particles and traversing at least 75%, 80%, 85%, 90%, 95% 90% of the vertical depth of a play, and a cased horizontal injection well 3-10 meters above and parallel with said production well.

The performance and ultimate success of SAGD depends on many factors including reservoir properties, steam chamber development, the length, spacing and location of the two horizontal wells, heat transfer, heat loss, and the ability to impact steam trap control to prevent inefficient production of live steam.

Well characteristics and design are also important to SAGD performance. The standard SAGD well design employs 800 to 1000 meter slotted liners with tubing strings attached near the toe and near the heel in both the injection and the production wells to provide two points of flow distribution control in each well. However, in the typical SAGD operation, steam heating is uneven, falling off away from the injection point and reducing effectiveness and increasing costs.

Figure 3:
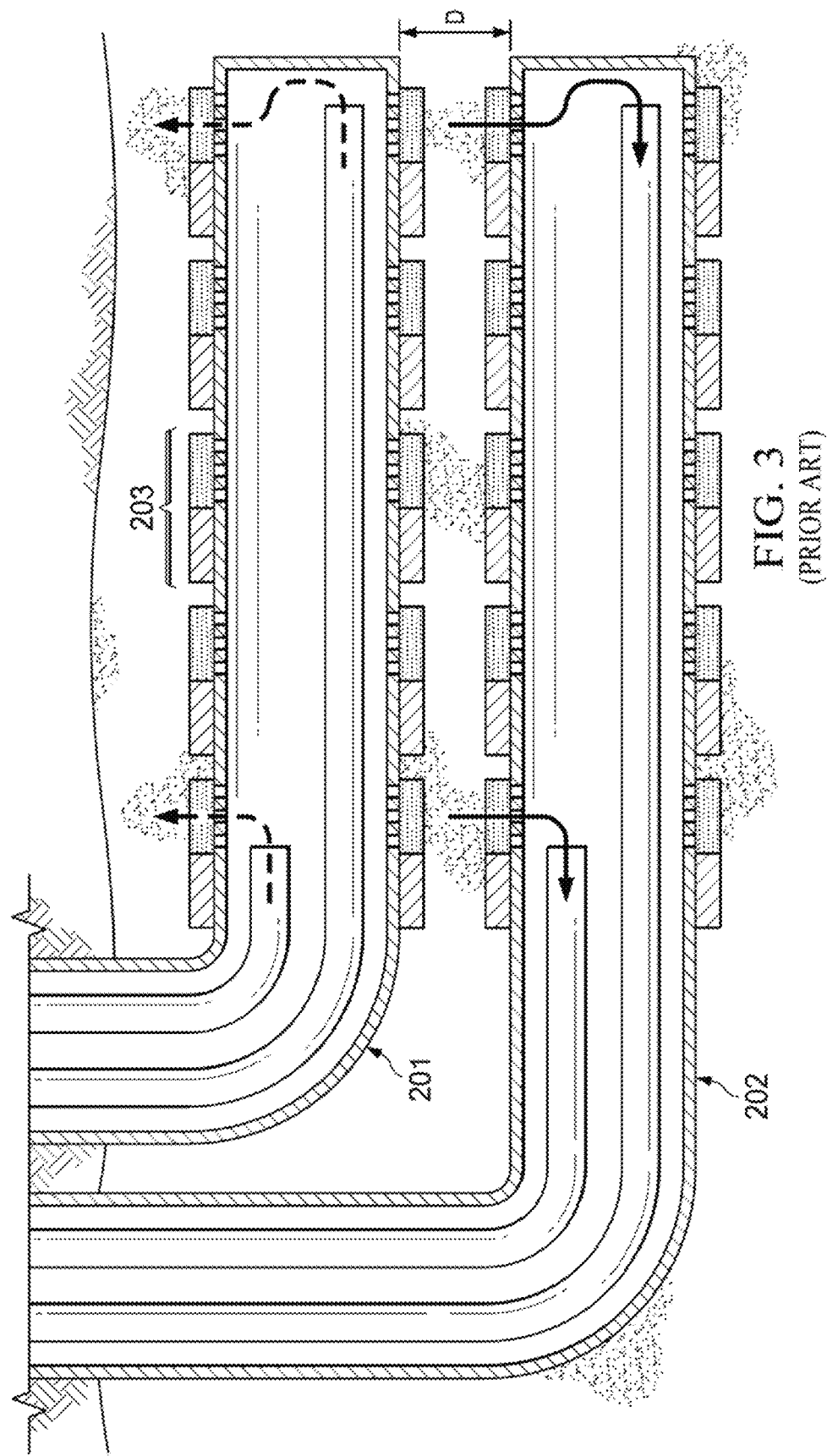
FIG. 3 SAGD completion design with flow control devices and limited spacing between an injection well on top and a production well on bottom.

An important improvement to the traditional SAGD design is the use of FCDs to control the steam. FIG. 3 depicts such a design from US20130213652, which is incorporated herein by reference for all purposes. Here, the injection well 201 may include a passive FCD 203 for controlling outflow. By slowing flow in areas where steam breakthrough occurs, the steam trap is maintained and maximum production occurs where steam breakthrough has not occurred. Differential flow along the production well 202 allows the steam trap to remain consistent and uniform, especially during the start-up phase. Additionally, the FCD allows for the preferential restriction of flow of the steam or water, as needed to maintain the desired steam flow during SAGD operations. If needed, packers can be used so that the production zone can be limited.

While the FCDs can be used to control the steam circulation during the start-up phase, it still takes time to raise the temperature of the inter-well rock/bitumen volume to enhance mobility and reduce bitumen viscosity. The present methods are intended to reduce or eliminate this steam circulation in the start-up phase by increasing the heat sources in the SAGD reservoir. Thus, a user can accelerate or eliminate the start-up procedure regardless of the presence of FCDs on the SAGD wells. Though the use of FCDs will aid in accelerating the start-up phase, the disclosed methods can be used on SAGD well already in place.

The present invention is exemplified with respect to the following description. However, this is exemplary only, and the invention can be broadly applied with any heating technique, particular those utilizing inexpensive materials. The following examples are intended to be illustrative only, and not unduly limit the scope of the appended claims.

Figure 4:
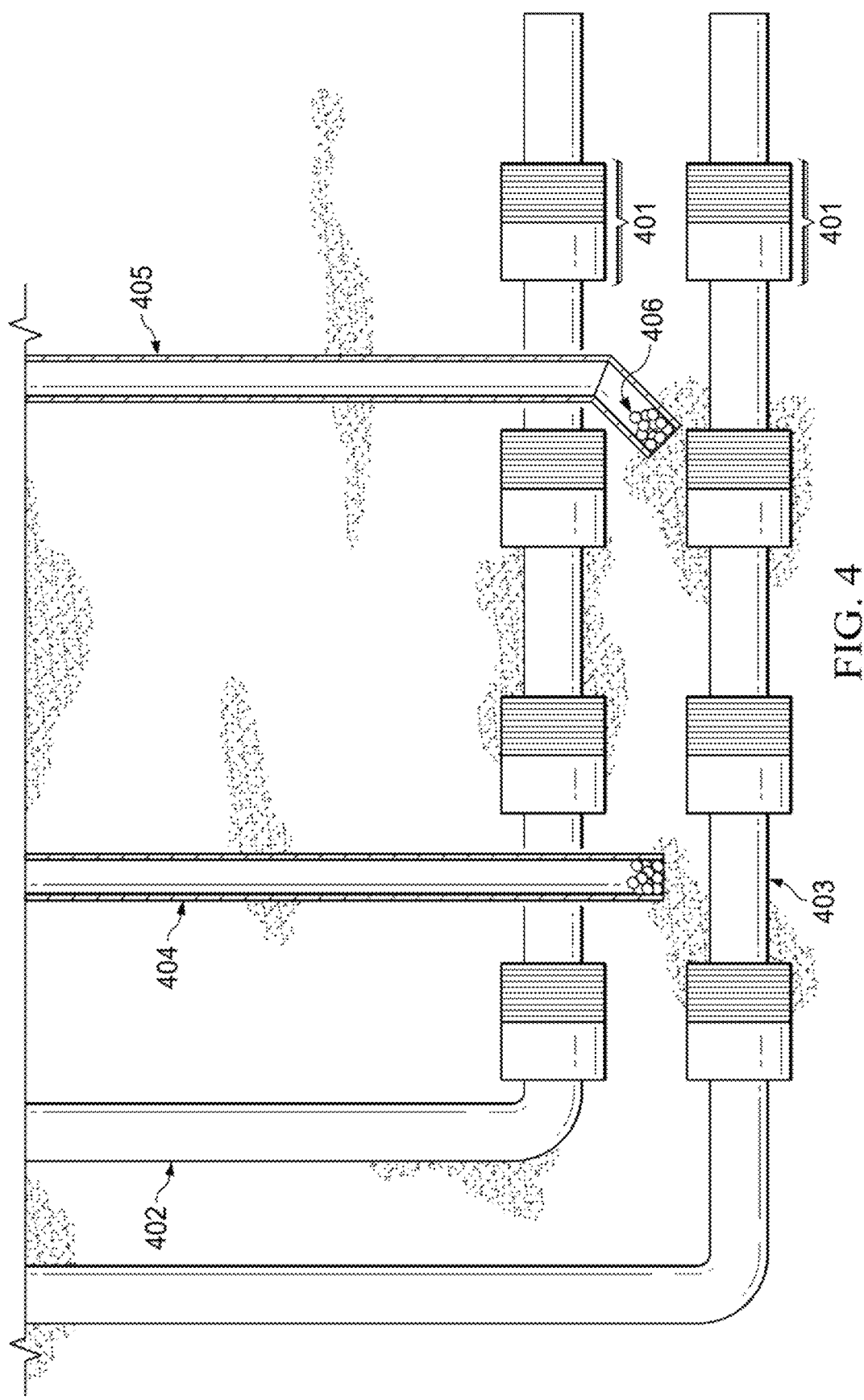
FIG. 4 Schematic of SAGD completion design for use with disclosed methods.

FIG. 4 displays a schematic of a SAGD completion design utilized the disclosed method. The SAGD design comprises an injector well 402 and a producer well 403 forming a well pair. These wells are drilled to be parallel and separated by a vertical distance of four to ten meters, or possibly less. While some deviations in the horizontal plane are expected due to imprecise drilling tools, the wells are substantially stacked in the vertical plane and are not offset laterally from each other.

In FIG. 4, both wells in the pair are shown having a plurality of passive FCDs 401. However, this is exemplary only as FCDs can also be located on the injection only, producer only, or neither well. Passive FCDs are not required for the disclosed methods, however they do help accelerate the start-up process if used in combination therewith, but AICDs and other flow control devices could be used as well. According to the present methods, one or more open-holes are drilled to cover most or all of the vertical distance of the play, or as shown here, the end slightly above the producer. The open-holes can be vertical 404 or have a slant 405, depending on their desired end point and geological considerations. A combination of open-hole well designs and depths can be used for a given SAGD field.

Figure 5:
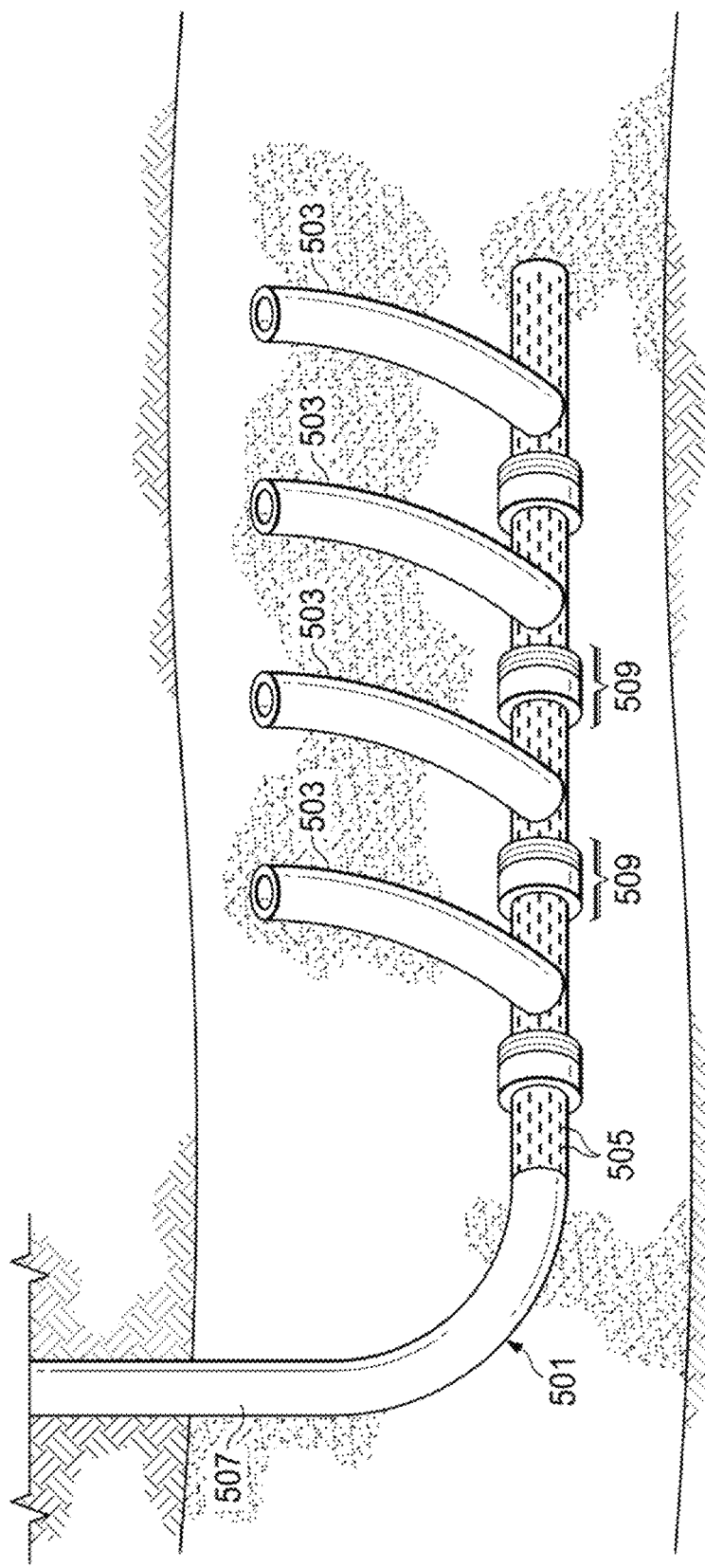
FIG. 5 Another embodiment of the invention where vertical open-hole wells are drilled off the producer.
Figure 6:
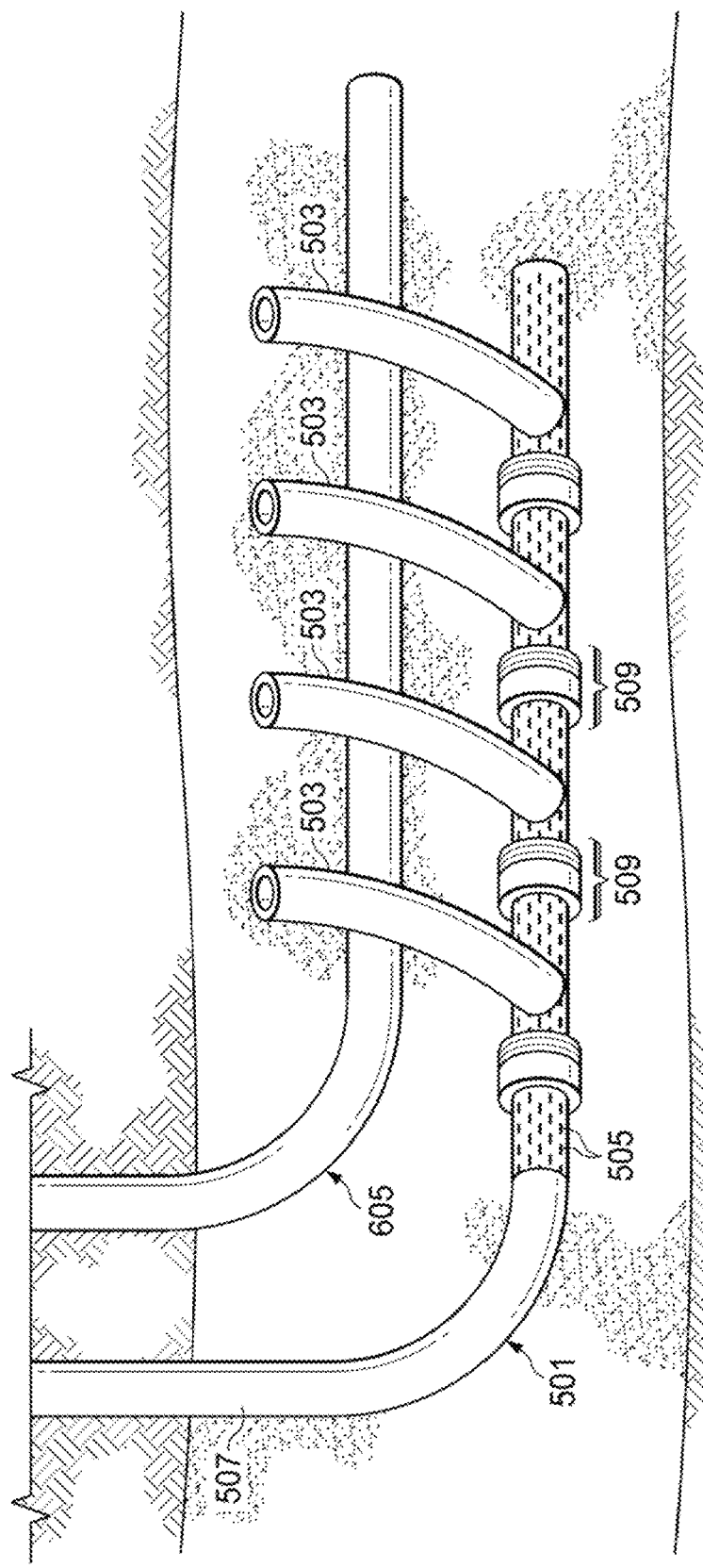
FIG. 6 Another embodiment of the invention where vertical open-hole wells are drilled off the producer, completed and then injector well is added.

FIGS. 5 and 6 show an alternate embodiment that is more cost effective than FIG. 4, wherein the vertical open-hole wells are laterally drilled off the producer. In drilling SAGD well pairs, the producer 501 is typically drilled first. It is then very easy to add up-tracks 503 from the producer, that extend up to the full reservoir thickness if desired. Just like a standard fishbone well, we drive the up-track up, come back and continue the main bore to the next up-track point. We then case the main bore ("motherbore" or "spine") of the producer well, leaving the open-hole vertical up-tracks (FIG. 5). The casing is slotted 505 in the production zone, and solid 507 in the vertical portion of the well. As above, passive flow control devices 509 can be used to prevent steam breakthrough.

Once the producer is complete, the injector 605 is typically drilled using standard magnetic ranging (tractor in the cased spine of the producer) to maintain the 4-10 meters of separation. The injector will typically intersect or be extremely close to the open-hole vertical up tracks allowing the accelerated communication (FIG. 6).

Once drilled, material for the chosen heating technique can be placed in the open-holes. Any heating technique can be used and a combination of heating techniques may be desirable. However, Applicant has found that the most efficient technique, both in terms of heat generation, cost, and time, are those that rely on MW/RF heating, resistive heating, and simple exothermic chemical reactions.

For these methods, the "consumable" material, i.e. the material that is actually heated, is often injected into the open-holes such that they are located in the reservoir between the well pairs. For example, FIG. 4 displays particles 406 for the desired heating technique in both open-holes 404/405. Small particles such as nanoparticles, granular mixtures, and powders are preferred as the energy transfer is more efficient.

In some embodiments, the particles are susceptible to excitation via microwave or radio frequency waves. Radio frequencies or microwaves can come from radio frequency generators that can be situated either above or below ground. The radio antennas should be directed towards the particles and can be placed either above ground, below ground or a combination of the two. It is the skill of the operator to determine the optimal placement of the radio antenna to achieve dipole moment vibration while still maintaining ease of placement of the antennas. Once excited by the radiation, the particles will begin to heat and will preheat the surrounding reservoir using conductive and convective mechanisms.

If more than one open-hole is utilized, then the open-holes can each have their own particles that are susceptible to excitation via microwave or radio frequency waves. This would allow for the use of one antenna for the open-holes or one antenna for 2, 3, 4 or more holes. Also, depending on the desired amount of heating, the chosen particles can be tuned such that particles in the first open-hole are susceptible to a first wavelength and will be heated to a first temperature, but particles in a second open-hole are susceptible to a second wavelength and will be heated to a second temperature, and so forth. Such fine tuning can be necessary for regions of the SAGD pair where more heat or less is needed to maintain a steam chamber.

Alternatively, the particles can be conductive material. Thus, a voltage can be applied across the open-hole, where it will be conducted by these particles. This results in the particles heating up as well as the surrounding reservoir. Depending on the proximity of the open-holes, a single device can be used to apply the voltage for two or more open-holes. As with the excitable RF particles, the conductive materials can also be selected to allow for fine tuning the amount of heat used.

As some ionic salts are both susceptible to microwave and radio frequency and are conductive, both heating techniques can be used together to preheat the reservoir.

In yet another alternative, the particles can be chemicals that react with e.g. water in exothermic reaction. Connate water as well as cooled steam will be able to contact such chemicals after they are placed in the open-holes, resulting in an exothermic reaction that heats up the surrounding reservoir. Powdered elemental alkali and alkaline earth metals (Group 1-2 metals) have extremely exothermic reactions with water and are relatively inexpensive. Further, these particles can be coated with a water soluble coating to delay the exothermic reaction. Polymers such as vinyl alcohol polymers, poly(aspartic acid), poly(acrylic acid), poly(methacrylic acid) and the like are preferred coatings as they are cheap and easy to deposit on particles or pellets.

Alternatively, a first reactant can be injected into the open-hole followed by a second reactant to achieve the exothermic reaction. However, this method may not be preferred as two different materials may be cost prohibitive.

In yet one more embodiment, a chemical reaction that requires external heating for reaction initiation can also be used. For example, thermite undergoes an extremely exothermic reduction-oxidation (redox) reaction once it is ignited by an external heating source. As heaters are easy to run into wells, such requirement may not be a limitation for certain SAGD fields. However, one skilled in the art would be able to determine the cheapest and most efficient reaction.

Also, while there are many different exothermic reactions that could be utilized in the present methods, one objective is to pre-heat the well with the low cost and readily available goods. Thus, the selected chemical reactants, and their reactions, will depend on the SAGD field design, associated cost, and amount of material needed, as well as location and transportation costs.

One other potential advantage of the chosen heating technique is that it can indirectly heat the reservoir. Here, the heated particles (regardless of how the heat is generated) will convey the heat to the surrounding reservoir. However, it is also possible to directly heat the reservoir in addition to the particles. Such is the case with the use of radio frequency. The waves can be tuned to heat the susceptible particles as well as polar compounds in the reservoir. This added advantage should also be considered when deciding which method is most cost efficient.

After the particles are heated, they will convey heat to the surrounding reservoir and raise the temperature of the bitumen so that it can flow. The steam circulation in the start-up can be ongoing during the particle-heating phase or can occur after the particles have transferred heat to the reservoir, or may be replaced entirely by the particle-preheating step.

It is expected that the more heat sources used, the quicker the start-up phase will occur. In some embodiments, three or more open-holes can reduce the start-up phase to as little as one month with significantly improved early time recovery. In others, no start-up phase with steam circulation will be needed as the reservoir will be heated with multiple bones allowing immediate communication.

Figure 7:
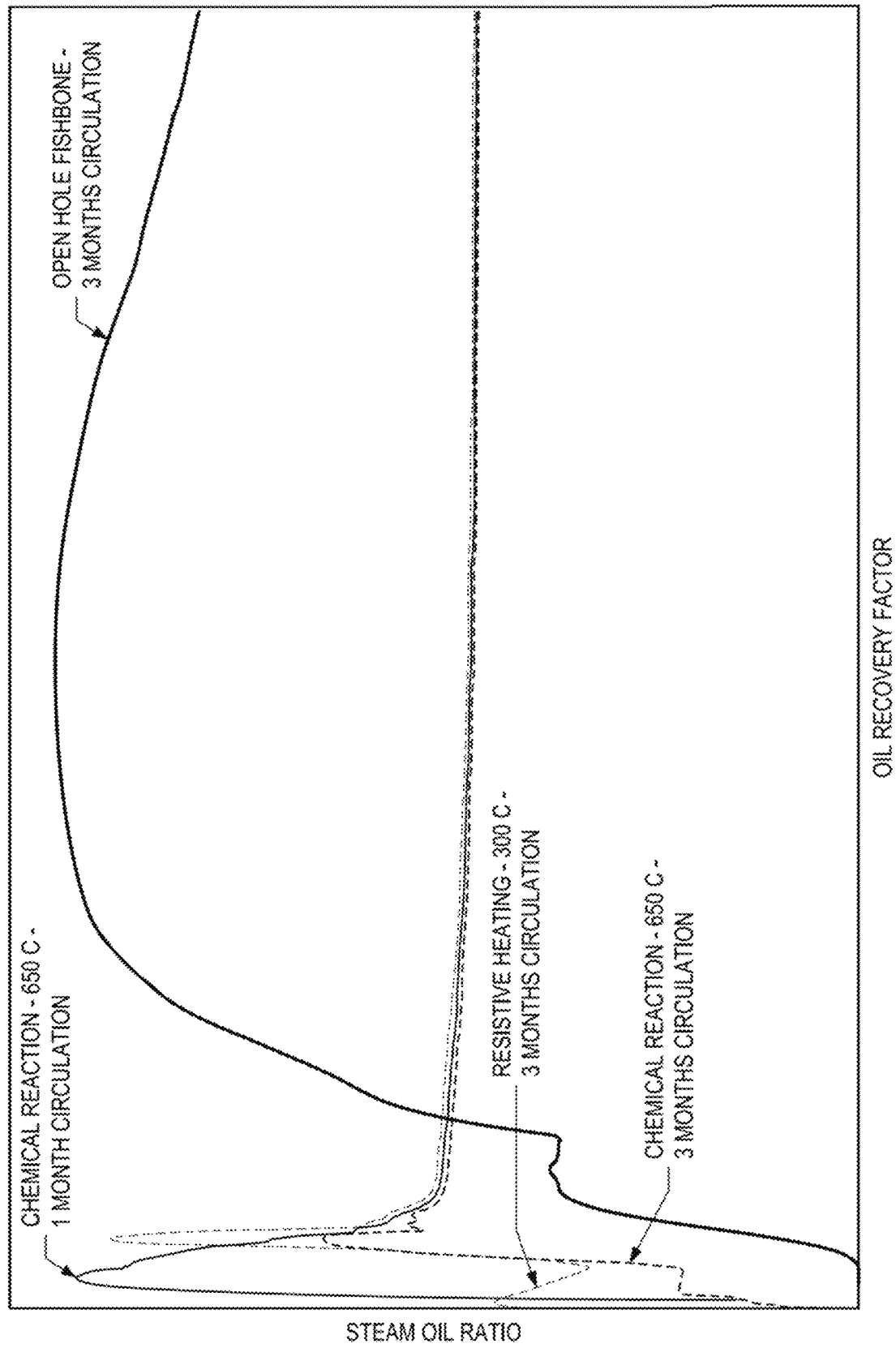
FIG. 7 Simulation results for Steam to Oil ratio (y axis) against Oil Recovery Factor (x axis) using a single, vertical open-hole well drilled from the producer and simulated for 3 months. Simulated results include resistive heating in the open-hole well for 1 and 3 months at 300° C., chemical reaction in the open-hole well at 650° C. for 1 and 3 months.
Figure 8:
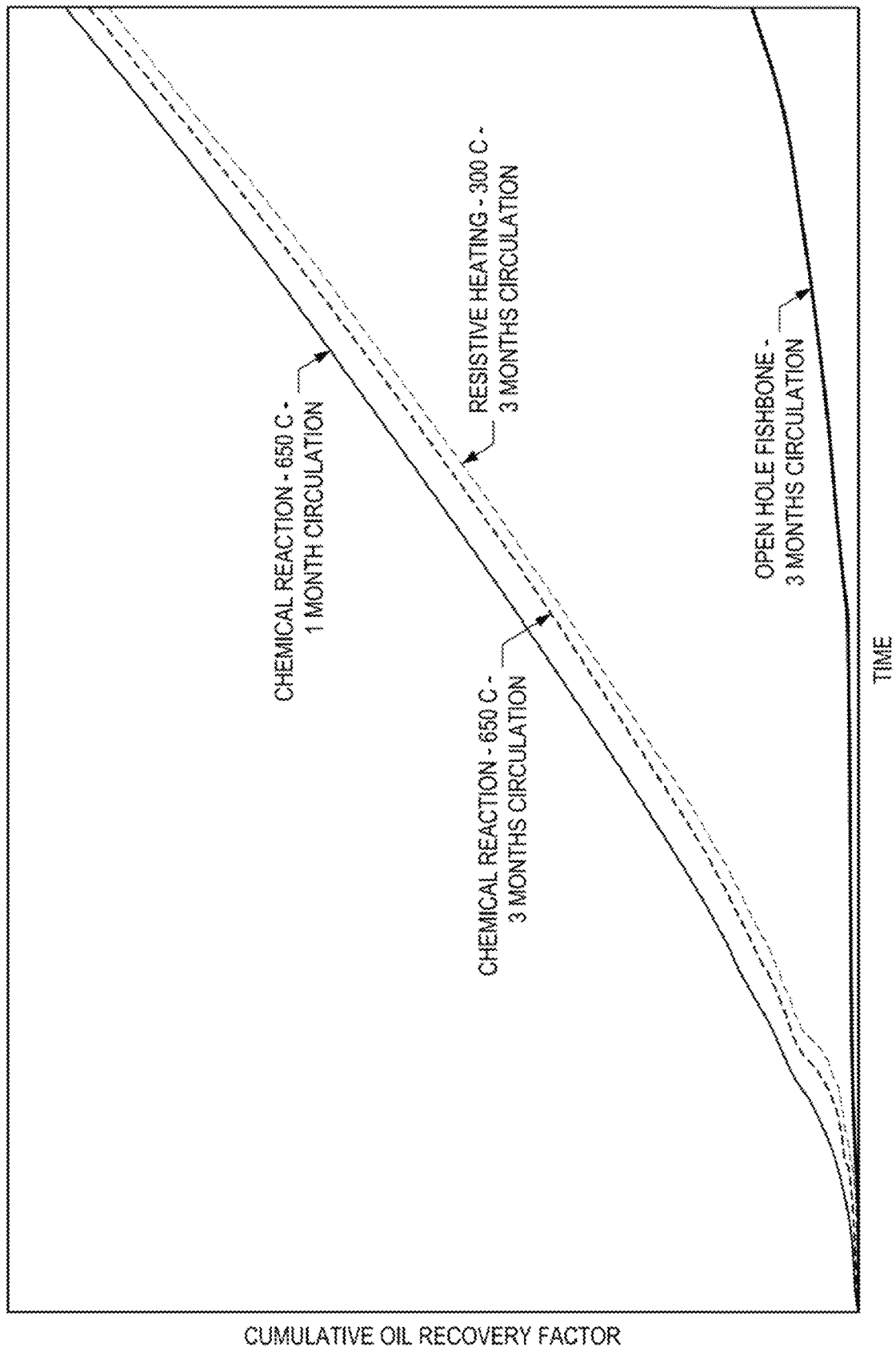
FIG. 8 Simulation results for Cumulative Steam to Oil ration (y axis) against time (x axis) using a single, vertical open-hole well drilled from the producer. Simulated results include resistive heating in the open-hole well for 1 and 3 months at 300° C., as well as chemical reaction in the open-hole well at 650° C. for 1 and 3 months.

A conceptual simulation shown in FIG. 7 using a chemical process, magnesium combustion limiting the heated bone to 650° C. or resistive heating with a temperature limit of 350° C. of an open-hole vertical fishbone well shows up to a 7x increase in early time cumulative production of oil. Reducing the start-up time by 67% utilizing the heated bones yielded the maximum improved performance through oil acceleration. As shown in FIG. 7, steam oil ratios were also reduced by up to 70% through the acceleration of oil production and reduced steam circulation in the early time. In FIG. 8 we can see that cumulative oil production is much higher when the vertical open-hole laterals are heated in any manner.

Once the SAGD wells are in communication and SAGD operations commence, the open-hole wells typically collapse because the steam chamber will melt the bitumen cement holding the unconsolidated sands that form the open-hole well walls. However, by placing the heatable material in the open-hole well, the open-hole wells remain open and in communication with the producer well during SAGD operations. This allows for the viscous hydrocarbons to flow into the open-hole wells, with the most dense portions of the fluid filling the wells, and the less dense fluids flowing out of the top of the open holes. The separation of fluids results in a pressure drop between the toe of the bones back to the Motherbore well (spine), with the viscous fluid driving flow through the fishbone to the producer. This 'viscous fluid drive' is separate from the gravity forces present in SAGD. The combination of both of these forces improves SAGD recovery.

Figure 9A:
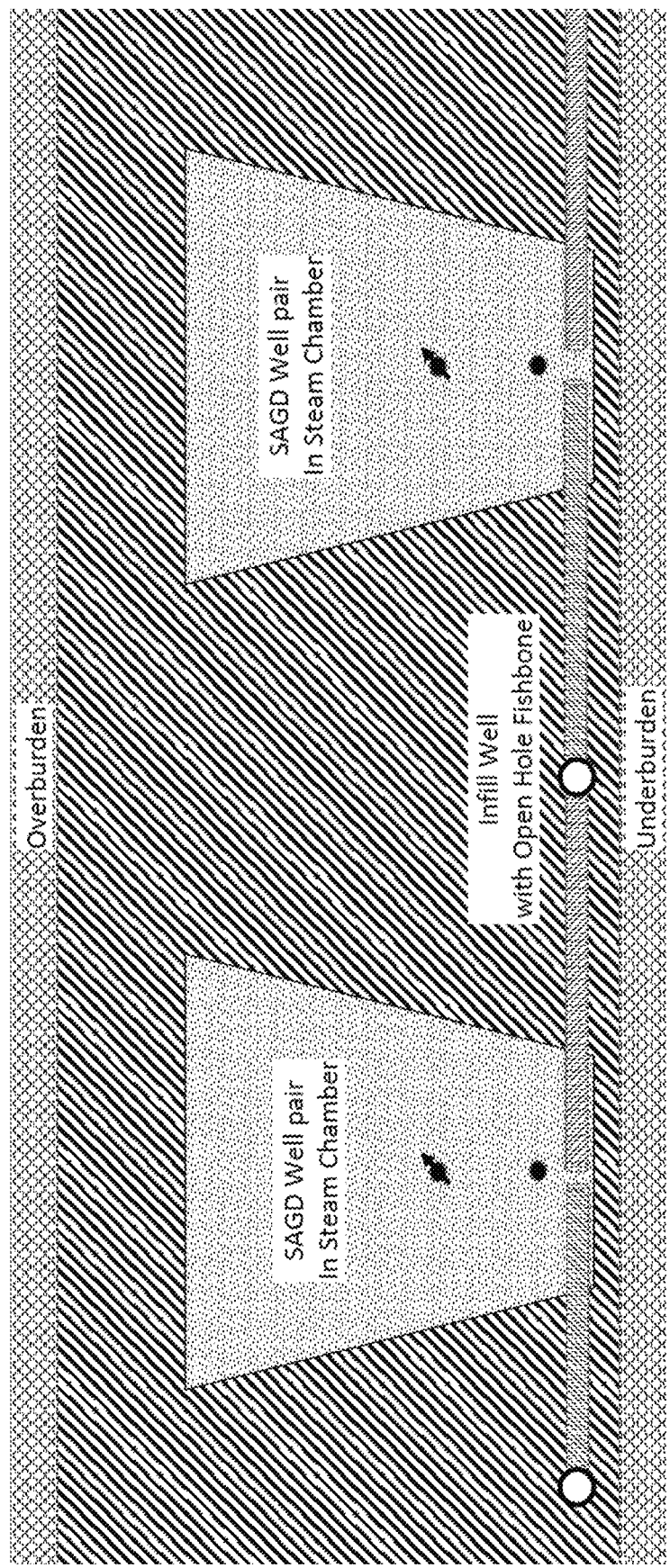
FIG. 9A Another embodiment of the invention where vertical open-hole wells are drilled between two SAGD steam chambers.
Figure 9B:
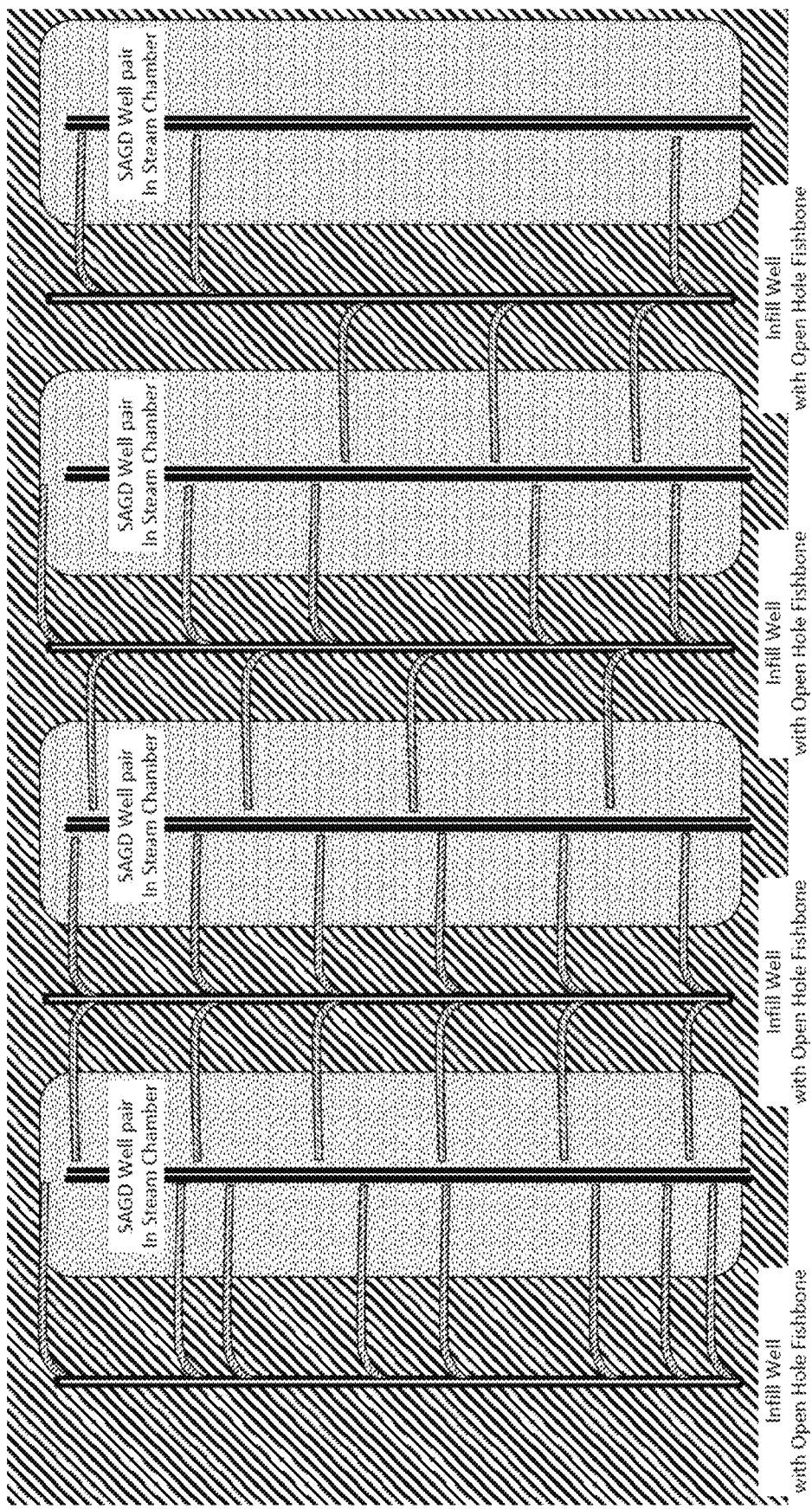
FIG. 9B An embodiment similar to FIG. 9A where multiple vertical open-hole wells are drilled between multiple SAGD steam chambers

In another embodiment, infill wells with fishbones are drilled adjacent to or between two SAGD steam chambers with SAGD well pairs located in the steam chamber, as shown in FIGS. 9A-B. The infill wells are typically drilled at the bottom of the reservoir in pockets of cold bitumen that cannot be heated and recovered by the existing SAGD operation. Because the infill wells can be connected directly to the existing steam chambers with open-hole wells. The open-hole wells are filled with a material and used to initiate production, the material is solid but typically is delivered in a mixture of solids with fluid. In some cases the materials may be delivered heated, in other cases the materials may be heated in place using chemical reactions, RF heating, conductive heating, and the like. Because there is fluid within the material, it allows production from the steam chamber to the infill well to initiate early if not immediately. Solid materials in the open-hole wells prevent collapse and provide a highly permeable channel for production. Fluids including the initial delivery fluid and heated condensate, bitumen, heavy oil, or a combination provide a channel for viscous fluid drive. One benefit to SAGD and infill wells with open-hole fishbone wells, is that production begins very early. Another benefit is that wells may be designed with greater distance between the well pairs and/or infill wells.

Although the systems and processes described herein have been described in detail, it should be understood that various changes, substitutions, and alterations can be made without departing from the spirit and scope of the disclosed methods as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The methods are specifically intended to be as broad as the claims below and their equivalents.

The following references are incorporated by reference in their entirety:

Butler, R. M., "Thermal Recovery of Oil & Bitumen", Chapter 7: "Steam-Assisted Gravity Drainage", Prentice Hall, (1991).

U.S. Pat. No. 5,215,146, Sanchez, "Method for reducing startup time during a steam assisted gravity drainage process in parallel horizontal wells" (1993).

U.S. Pat. No. 7,909,093, Brown, "In Situ Combustion as Adjacent Formation Heat Source" (2010).

U.S. Pat. No. 8,118,095, Sarathi, "In Situ Combustion Processes and Configurations Using Injection and Production Wells" (2010).

U.S. Pat. No. 8,312,926, Wheeler, "Method for Reducing Thermal Loss in A Formation" (2010).

U.S. Pat. No. 8,353,343, Seaba, "Hydrocarbon Production Process" (2010).

U.S. Pat. No. 8,365,823, Dreher, "In-Situ Upgrading of Heavy Crude Oil in A Production Well Using Radio Frequency or Microwave Radiation and A Catalyst" (2010).

U.S. Pat. No. 8,387,690, Menard, "Completion Method for Horizontal Wells in In Situ Combustion" (2011).

U.S. Pat. No. 8,464,789, Banerjee, "Process for Enhanced Production of Heavy Oil Using Microwaves" (2011).

U.S. Pat. No. 8,528,639, Fang, "Method For Accelerating Start-Up For Steam-Assisted Gravity Drainage (SAGD) Operations" (2012).

U.S. Pat. No. 8,555,970, Wheeler, "Accelerating the Start-Up Phase for A Steam Assisted Gravity Drainage Operation Using Radio Frequency or Microwave Radiation" (2010).

U.S. Pat. No. 8,607,866, Fang, "Method for Accelerating Start-Up for Steam Assisted Gravity Drainage Operations" (2010).

U.S. Pat. No. 8,607,884, Wheeler, "Processes of Recovering Reserves with Steam and Carbon Dioxide Injection" (2011).

U.S. Pat. No. 8,656,998, Dong, "In Situ Heating for Reservoir Chamber Development" (2011).

U.S. Pat. No. 8,656,999, Latimer, "Water Treatment Using A Direct Steam Generator" (2011).

U.S. Pat. No. 8,720,547, Banerjee, "Process for Enhanced Production of Heavy Oil Using Microwaves" (2011).

U.S. Pat. No. 8,720,549, Banerjee, "Process for Enhanced Production of Heavy Oil Using Microwaves" (2011).

U.S. Pat. No. 8,936,090, Sultenfuss, "Inline RF Heating for SAGD Operations" (2012).

U.S. Pat. No. 8,967,282, Dreher, "Enhanced Bitumen Recovery Using High Permeability Pathways" (2011).

U.S. Pat. No. 8,978,755, Sultenfuss, "Gravity Drainage Startup Using RF & Solvent" (2012).

U.S. Pat. No. 9,267,367, Wheeler, "Method for Steam Assisted Gravity Drainage with Pressure Differential Injection" (2012).

U.S. Pat. No. 9,453,400, Wheeler, "Enhanced Recovery and In Situ Upgrading Using RF" (2012).

U.S. Pat. No. 9,739,123, Wheeler, "Dual Injection Points In SAGD" (2012).

U.S. Pat. No. 9,845,668, Ryan, "Side-Well Injection and Gravity Thermal Recovery Processes" (2013)

U.S. Pat. No. 9,920,596, Dong, "Coal Bed Methane Recovery" (2011).

US20100294488, Wheeler, "Accelerating the Start-Up Phase for A Steam Assisted Gravity Drainage Operation Using Radio Frequency or Microwave Radiation" (2010)

US20110174488, Morris, "Accelerated Start-Up in SAGD Operations" (2011).

US20120227964, Lamont, "Carbon Dioxide Gas Mixture Processing with Steam Assisted Oil Recovery" (2012).

US20122027966, Dreher, "In Situ Catalytic Upgrading" (2012).

US20120312534, Nasr, "Enhanced Hydrocarbon Recovery Through Gas Production Control for Noncondensable Solvents or Gases in SAGD or ES-SAGD Operations" (2012).

US20130000897, Fang, "Recycling $CO_2$ In Heavy Oil or Bitumen Production" (2013).

US20140190689, Warren, "Use of Foam with In Situ Combustion Process" (2014).

US20150159476, Warren, "Oil Recovery with Insulating Composition" (2015).

US20150198022, Stanecki, "Oil Recovery with Fishbone Wells and Steam" (2015).

US20150198027, Wickramathilaka, "Anti-Retention Agent in Steam-Solvent Oil Recovery" (2015).

US20160341021

US20170081950, Filatyev, "Thermal Conditioning of Fishbones" (2017).

US20170356275, Wheeler, "Flow Control Devices in SW-SAGD" (2017).

WO2015000065, Al-Murayri, "Accelerated Solvent-Aided SAGD Start-Up" (2015).

The invention claimed is:

1. A method of producing hydrocarbon from a subsurface formation comprising:
   a) providing a gravity drainage production well pair within a formation comprising an horizontal injection well over a generally parallel horizontal production well;
   b) providing one or more stand-alone vertical open-hole well(s) covering most or all the vertical depth of a play near said injection well and said production well, each stand-alone vertical open-hole well(s) being filled with heatable particles therein;
   c) heating said particles, wherein said heated particles transfer heat to said formation;
   d) circulating steam in said injection well and said production well for a startup period until said injection well and said production well are in fluid communication;
   e) injecting steam only into said injection well and producing hydrocarbons from said production well; and
   f) wherein said startup period is reduced in time as compared with a similar method omitting said stand-alone vertical open-hole wells and said particle heating.

2. The method of claim 1, wherein said particles are susceptible to Microwave/Radio-Frequency (MW/RF) and said heating step comprises exciting and heating said particles using antenna generating microwaves or radio frequency.

3. The method of claim 2, wherein said particles are chosen from a group comprising metal ion salts, transitional metal complexes or organometallic complexes.

4. The method of claim 1, wherein said particles are conductive and sail heating step comprises applying a voltage to said particles.

5. The method of claim 4, wherein said particles are chosen from a group comprising metals, electrolytes, superconductors, semiconductors, plasmas, graphite, conducting polymers or combinations thereof.

6. The method of claim 5, wherein said conducting polymers are polydiacetylene, polyacetylene, polypyrrole, polyaniline, poly thiophene, polyisothionaphthene, polyheteroary len vinylene, poly-p-pheny lene, polyphthalocyanine, their derivatives their copolymer's, or combinations thereof.

7. The method of claim 6, wherein said particles are polyaniline.

8. The method of claim 1, wherein said particles react exothermically with water, and said heating step comprises reacting said particles with water in said reservoir.

9. The method of claim 8, wherein said particles have a water-soluble coating.

10. The method of claim 8, wherein said particles are chosen from a, group comprising elemental sodium, elemental potassium, elemental lithium, elemental calcium, elemental magnesium, a phosphorus oxide, iron, and sulfur.

11. The method of claim 10, wherein said particles have a water soluble coating.

12. The method of claim 1, wherein said particles are thermite and the heating step initiates a thermite reaction.

13. The method of claim 12, wherein said thermite has a fuel chosen from a group comprising aluminum, magnesium, titanium, zinc, silicon, and boron, and an oxidizer chosen from a group comprising bismuth(III) oxide, boron(III) oxide, silicon(IV) oxide, chromium(III) oxide, manganese(IV) oxide, iron(III) oxide, iron(II,III) oxide, copper(II) oxide, and lead(II,IV) oxide.

14. The method of claim 1, wherein said injection well, said production well, or both wells have at least one flow control device.

15. The method of claim 14, wherein said low control devices, are a rate sensitive flow restrictor or a rate sensitive flow valve.

16. The method of claim 1, wherein said heating step and said circulating step occur at the same time.

17. The method of claim 1, wherein said heating step occurs before said circulating step occurs.

18. The method of claim 1, wherein said stand-alone vertical open-hole wells traverse at least 90% of the vertical depth of a play.

19. The method of claim 1, wherein said stand-alone vertical open-hole wells are within 1 meter of said injection well and said production well.

20. An improved start-up method for a Steam Assisted Gravity Drainage (SAGD) operation, wherein said SAGD operation comprises forming a gravity drainage production well pair within a formation play comprising an horizontal injection well 3-10 meters over a parallel horizontal production well, wherein steam is circulated through said injection well and said production well during a start-up period before gravity drainage of hydrocarbons begins, said improvement comprising i: drilling a plurality of stand-alone vertical open-hole wells near said injection well and said production well and covering most or all the vertical depth of said formation play, ii: filling said stand-alone vertical open-hole wells with one or more particles, and iii: heating said particles during said start-up period such that the heated particles transfer heat to the surroundings, wherein said improvement decreases said start-up period as compared to a similar method not using said stand-alone vertical open-hole wells and heating of particles, wherein:
a) said particles are susceptible to Microwave/Radio-Frequency (MW/RF) and said heating step comprises exciting and heating said particles using antenna generating microwaves or radio frequency; or
b) said particles are conductive and said heating step comprises applying a voltage to said particles; or
c) said particles react exothermically with water and the heating step comprises reacting said particles with water in said reservoir; or
d) said particles are thermite and the heating step initiates the thermite reaction.

* * * * *